(12) United States Patent
Nakagawa

(10) Patent No.: US 9,607,250 B2
(45) Date of Patent: Mar. 28, 2017

(54) INFORMATION PROCESSING APPARATUS, METHOD FOR CONTROLLING THE SAME, AND INFORMATION PROCESSING PROGRAM

(71) Applicant: CANON KABUSHIKI KAISHA, Tokyo (JP)

(72) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/959,216

(22) Filed: Aug. 5, 2013

(65) Prior Publication Data

US 2014/0055799 A1   Feb. 27, 2014

(30) Foreign Application Priority Data

Aug. 27, 2012 (JP) .................................. 2012-186465

(51) Int. Cl.
| | | |
|---|---|---|
| G06F 15/00 | (2006.01) | |
| G06K 15/02 | (2006.01) | |
| G06F 3/12 | (2006.01) | |

(52) U.S. Cl.
CPC ....... G06K 15/1803 (2013.01); G06F 3/1205 (2013.01); G06F 3/1257 (2013.01); G06F 3/1284 (2013.01)

(58) Field of Classification Search
CPC ..... G06F 3/1253; G06F 3/1255; G06F 3/1257
USPC ....................................................... 358/1.13
See application file for complete search history.

(56) References Cited

U.S. PATENT DOCUMENTS

| | | | |
|---|---|---|---|
| 6,563,519 B1 * | 5/2003 | Minagawa | .................... 715/764 |
| 8,576,443 B2 | 11/2013 | Tajima | |
| 8,700,635 B2 | 4/2014 | Kinouchi | |
| 2009/0201515 A1 * | 8/2009 | Kiuchi | .................. G06F 3/1208 358/1.2 |
| 2010/0238499 A1 | 9/2010 | Wakui | |
| 2012/0081740 A1 | 4/2012 | Takagi | |

FOREIGN PATENT DOCUMENTS

| | | |
|---|---|---|
| CN | 1908884 | 2/2007 |
| CN | 102404474 | 4/2012 |
| JP | 2010-224591 | 10/2010 |

OTHER PUBLICATIONS

Chinese Office Action issued Jan. 12, 2016 during prosecution of related Chinese application No. 201310376078.9. (Whole English-language translation included.).

\* cited by examiner

*Primary Examiner* — Tammy Paige Goddard
*Assistant Examiner* — Mark Milia
(74) *Attorney, Agent, or Firm* — Fitzpatrick, Cella, Harper & Scinto

(57) ABSTRACT

Provided is an information processing apparatus that includes a first display unit configured to display the name of registered print setting information; a determination unit configured to determine whether or not print setting information set for output data and print setting information of the name are identical when the output data is generated based on the print setting information set via a setting screen; and a second display unit configured to display the name of the registered print setting information as the name of the print setting information set for the output data when the determination unit determines that the print setting information set for the output data and the print setting information of the name are identical.

22 Claims, 10 Drawing Sheets

FIG. 3

My sheet — 300

Frequently-used setting: — 301
- 2 in 1 (Single-sided)
- 2 in 1 (Double-sided)
- Double-sided
- Output sheet size A4 fixed
- Bookbinding layout
- Confidential

[detail]

[↑] [Register] — 302

Setting history: — 303
- Current setting
- 2012/04/25 18:53:10
- 2012/04/25 09:29:24
- 2012/04/24 16:07:13
- 2012/04/20 16:06:19
- 2012/03/12 14:47:43
- 2012/03/11 08:32:05
- 2012/03/09 15:49:11
- 2012/03/05 20:33:50

[◀] [ = ] [▶]

[Close]

--- iR ABC LIPSLX XPS — 310

Tabs: Basic | Layout | Feed | Discharge | Print quality | Front cover | Support

Original size: A4 ▶ [Detail]
Output sheet size: Same as original size ▶
Copies: 1 (1~9999)

Print orientation: Ⓐ ●Portrait  Ⓐ ○Landscape

☐ Page aggregation
Page aggregation type: 1 in 1 (Standard) ▶

☐ Double-sided printing

Binding direction: Left-side binding ▶

Output method: Print ▶

☐ Display preview prior to printing
☐ Monochrome printing

[Close my sheet]

[OK] — 311   [Cancel]   [Apply] — 312

[User setting sheet] [Return to standard] [Help]

FIG. 4

| Frequently-used setting | Page aggregation | Binding direction | Double-sided printing | Output sheet size | Bookbinding | Stamping |
|---|---|---|---|---|---|---|
| 2 in 1 (Single-sided) | On (2 in 1, from left to right) | Top-side binding | Off | Same as original size | Off | Off |
| 2 in 1 (Double-sided) | On (2 in 1, from left to right) | Top-side binding | On | Same as original size | Off | Off |
| Double-sided | Off | Left-side binding | On | Same as original size | Off | Off |
| Output sheet size A4 fixed | Off | Left-side binding | Off | A4 | Off | Off |
| Bookbinding layout | Off | Left-side binding | On | Same as original size | On (Processing on driver side) | Off |

FIG. 5

| Setting history | Page aggregation | Binding direction | Double-sided printing | Output sheet size | Bookbinding | Stamping |
|---|---|---|---|---|---|---|
| 2012/04/25 18:53:10 | On (2 in 1, from left to right) | Top-side binding | On | Same as original size | Off | Off |
| 2012/04/25 09:29:24 | On (2 in 1, from left to right) | Top-side binding | On | Same as original size | Off | Off |
| 2012/04/24 16:07:13 | Off | Left-side binding | On | Same as original size | Off | Off |
| 2012/04/20 16:06:19 | On (2 in 1, from left to right) | Left-side binding | On | A4 | Off | On (Confidential) |
| 2012/03/12 14:47:43 | On (2 in 1, from left to right) | Top-side binding | On | Same as original size | Off | Off |
| 2012/03/11 08:32:05 | Off | Left-side binding | On | Same as original size | On | Off |
| 2012/03/09 15:49:11 | On (2 in 1, from left to right) | Left-side binding | On | Same as original size | Off | Off |
| 2012/03/05 20:33:50 | On (2 in 1, from left to right) | Top-side binding | Off | Same as original size | Off | Off |
| 2012/02/29 12:17:38 | On (2 in 1, from left to right) | Top-side binding | On | Same as original size | Off | Off |
| 2012/02/15 15:15:29 | On (2 in 1, from left to right) | Top-side binding | On | Same as original size | Off | Off |
| 2012/04/25 18:53:10 | On (2 in 1, from left to right) | Top-side binding | On | Same as original size | Off | Off |

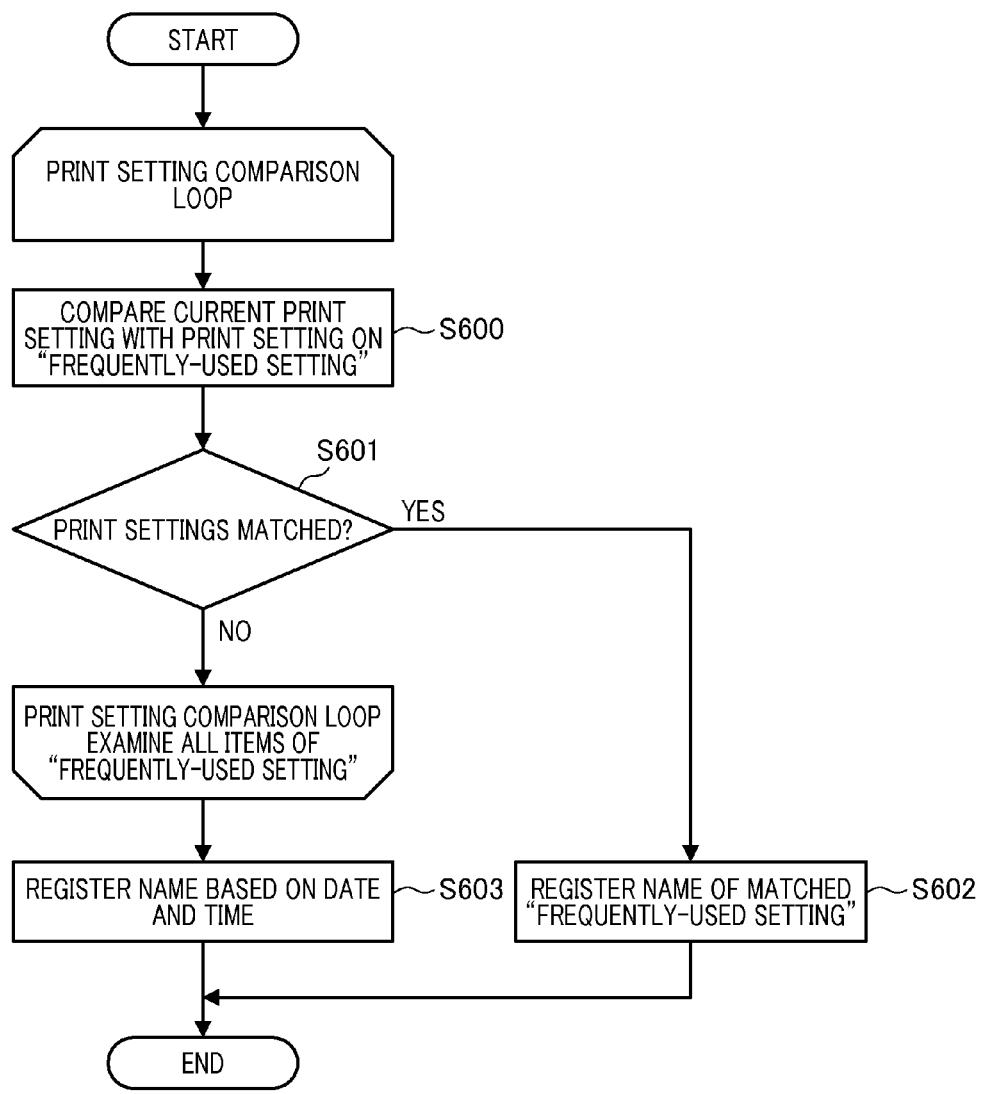

FIG. 7

| Frequently-used setting | Page aggregation | Binding direction | Double-sided printing | Output sheet size | Bookbinding | Stamping | Set time (Old name) |
|---|---|---|---|---|---|---|---|
| 2 in 1 (Double-sided) | On (2 in 1, from left to right) | Top-side binding | On | Same as original size | Off | Off | 2012/04/25 18:53:10 |
| 2 in 1 (Double-sided) | On (2 in 1, from left to right) | Top-side binding | On | Same as original size | Off | Off | 2012/04/25 09:29:24 |
| Double-sided | Off | Left-side binding | On | Same as original size | Off | Off | 2012/04/24 16:07:13 |
| 2012/04/20 16:06:19 | On (2 in 1, from left to right) | Left-side binding | On | A4 | Off | On (Confidential) | 2012/04/20 16:06:19 |
| 2 in 1 (Double-sided) | On (2 in 1, from left to right) | Top-side binding | On | Same as original size | Off | Off | 2012/03/12 14:47:43 |
| Double-sided | Off | Left-side binding | On | Same as original size | On | Off | 2012/03/11 08:32:05 |
| 2012/03/09 15:49:11 | On (2 in 1, from left to right) | Left-side binding | On | Same as original size | Off | Off | 2012/03/09 15:49:11 |
| 2 in 1 (Double-sided) | On (2 in 1, from left to right) | Top-side binding | On | Same as original size | Off | Off | 2012/03/05 20:33:50 |
| 2 in 1 (Single-sided) | On (2 in 1, from left to right) | Top-side binding | Off | Same as original size | Off | Off | 2012/02/29 12:17:38 |
| 2 in 1 (Double-sided) | On (2 in 1, from left to right) | Top-side binding | On | Same as original size | Off | Off | 2012/02/15 15:15:29 |
| 2 in 1 (Double-sided) | On (2 in 1, from left to right) | Top-side binding | On | Same as original size | Off | Off | 2012/04/25 18:53:10 |

FIG. 8

My sheet — 300

Frequently-used setting: — 301
- 2 in 1 (Single-sided)
- 2 in 1 (Double-sided)
- Double-sided
- Output sheet size A4 fixed
- Bookbinding layout
- Confidential Register — 302 | Detail Setting history: — 303
- Current setting
- 2 in 1 (Double-sided)
- Double-sided
- 2012/04/20 16:06:19
- 2 in 1 (Double-sided)
- Double-sided
- 2012/03/05 20:33:50
- 2 in 1 (Double-sided)

Close

--- iR ABC LIPSLX XPS — 310

Tabs: Basic | Layout | Feed | Discharge | Print quality | Front cover | Support

- Original size: A4
- Output sheet size: Same as original size
- Copies: 1 (1~9999)
- Print orientation: ⦿ Portrait ○ Landscape
- ☐ Page aggregation:
- Page aggregation type: 1 in 1 (Standard)
- ☐ Double-sided printing
- Binding direction: Left-side binding
- Output method: Print
- ☐ Display preview prior to printing
- ☐ Monochrome printing Detail Close my sheet User setting sheet | Return to standard OK — 311 | Cancel | Apply — 312 | Help ND INFORMATION PROCESSING APPARATUS, METHOD FOR CONTROLLING THE SAME, AND INFORMATION PROCESSING PROGRAM

BACKGROUND OF THE INVENTION

Field of the Invention

The present invention relates to an information processing apparatus that executes print processing, a method for controlling the same, and a program.

Description of the Related Art

There is a printer driver as software that generates a page description language (PDL or also referred to as "print data") to be transmitted from application running on an operating system (hereinafter referred to as "OS") mounted on an information processing apparatus to a print device such as a printer. The information processing apparatus receives various setting operations such as sheet feed cassette selection, color processing method setting, sheet discharge method selection, and the like via the printer driver. At this time, print setting information is set by a user interface provided by the application or a setting screen provided by the printer driver.

The function of the printer driver has been improved year by year, resulting in an increase in load on the setting operation. As a method for overcoming the circumstances, Japanese Patent Laid-Open No. 2010-224591 discloses a technique for reusing setting history data.

In the method disclosed in Japanese Patent Laid-Open No. 2010-224591, names based on date and time information are employed as setting history data. In the present invention, the names of setting history data are set such that a user can readily recognize the content of setting history data.

SUMMARY OF THE INVENTION

According to an aspect of the present invention, an information processing apparatus is provided that includes a first display unit configured to display the name of registered print setting information; a determination unit configured to determine whether or not print setting information set for output data and print setting information of the name are identical when the output data is generated based on the print setting information set via a setting screen; and a second display unit configured to display the name of the registered print setting information as the name of the print setting information set for output data when the determination unit determines that the print setting information set for the output data and the print setting information of the name are identical.

According to the present invention, a user can readily recognize the content of setting history data.

Further features of the present invention will become apparent from the following description of exemplary embodiments with reference to the attached drawings.

BRIEF DESCRIPTION OF THE DRAWINGS

FIG. 3 is a diagram illustrating an exemplary print setting screen to be displayed on a display.

FIG. 4 is a diagram illustrating an example of representative setting content on a "frequently-used setting" list.

FIG. 5 is a diagram illustrating an example of setting content on a "setting history" list.

FIG. 6 is a flowchart illustrating name setting processing according to one embodiment of the present invention.

FIG. 7 is a diagram illustrating an example of print setting content changed by the processing shown in FIG. 6.

FIG. 8 is a diagram illustrating an exemplary print setting screen changed by the processing shown in FIG. 6.

DESCRIPTION OF THE EMBODIMENTS

Hereinafter, preferred embodiments of the present invention will be described with reference to the attached drawings.

First Embodiment

Figure 1:
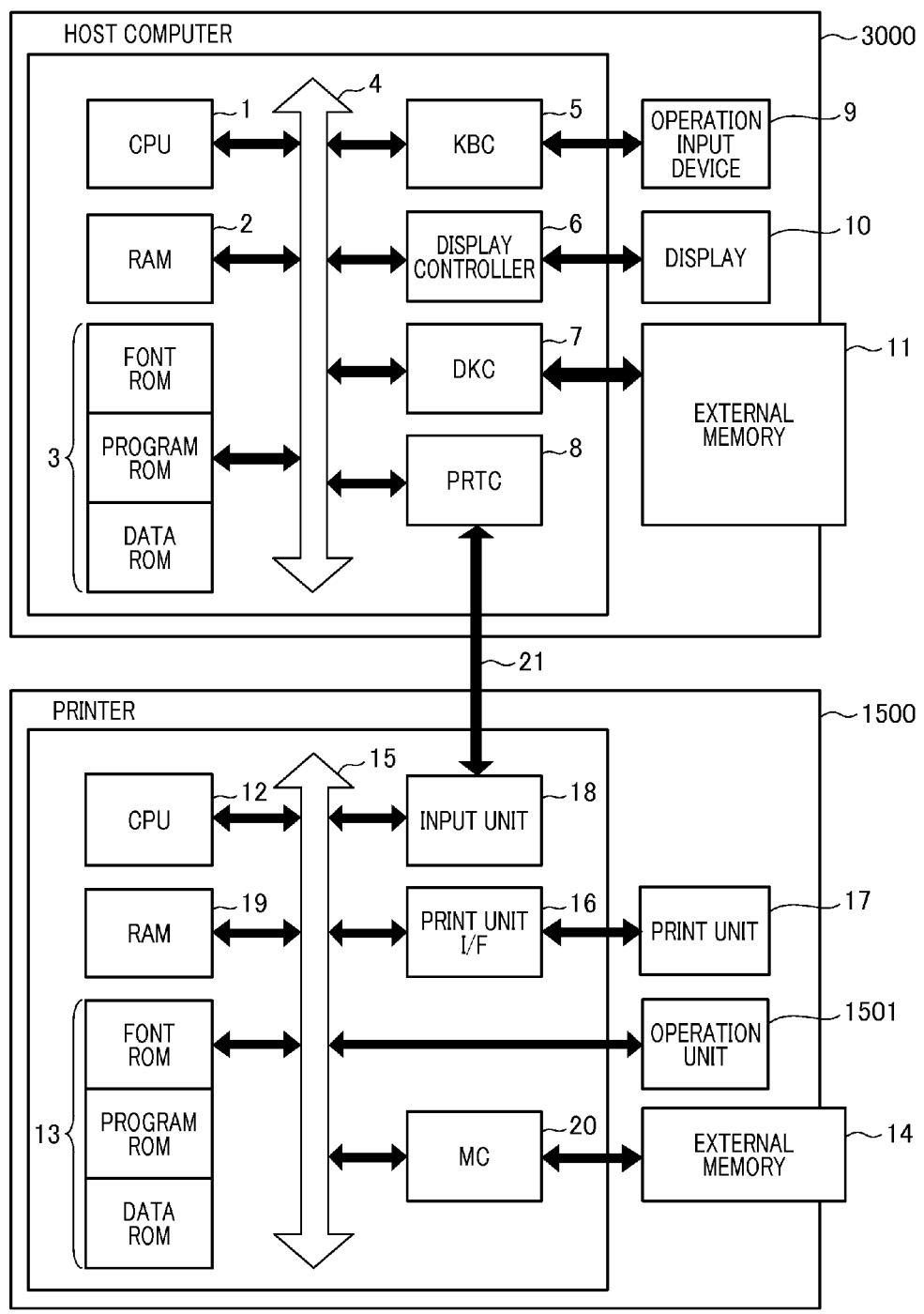
FIG. 1 is a diagram illustrating a print processing system according to one embodiment of the present invention.

Firstly, a description will be given of an information processing apparatus according to a first embodiment of the present invention. FIG. 1 is a block diagram illustrating an example of a configuration of an information processing apparatus according to the present embodiment. In the present embodiment, the information processing apparatus (print processing system) includes a host computer 3000 and a printer 1500 that performs printout by receiving print data from the host computer 3000. While, in the present embodiment, a description will be given by taking an example of print processing as image output processing, the present invention is not limited to print processing but may also be used for output processing such as PDF conversion, fax output, or the like. Note that an environment in which these functions are executed may be constituted by a single apparatus or a system consisting of a plurality of apparatuses. The present invention is also applicable to a system that performs processing by establishing connection via a computer network such as LAN (Local Area Network), WAN (Wide Area Network), or the like.

The host computer 3000 shown in FIG. 1 includes a CPU (Central Processing Unit) 1 and executes processing for document data in which graphics, images, characters, tables (including spreadsheets or the like), and the like coexist based on a document processing program, an information processing program, or the like. The document processing program is stored in a program ROM in a ROM (Read Only Memory) 3 or an external memory 11. The CPU 1 generally controls devices which are connected to a system bus 4. Also, the program ROM in the ROM 3 or the external memory 11 stores an OS program or like which is the control program executed by the CPU 1. The font ROM in the ROM 3 or the external memory 11 stores font data or the like used in document processing, and the data ROM in the ROM 3 or the external memory 11 stores various data used in document processing or the like. A RAM (Random Access Memory) 2 functions as a main memory, a work area, or the like in the CPU 1. A keyboard controller (KBC) 5 controls key input from an operation input device 9 such as a keyboard or a pointing device. A display controller 6 controls display on a display 10. A disk controller (DKC) 7 controls access to the external memory 11 such as a hard disk (HD), a solid state drive (SSD), a flexible disk (FD), or the like. These storage devices stores a boot program, various applications, font data, a user file, an editing file, a print control program, and the like. Hereinafter, a printer control command generation program used for print control is referred to as "printer driver" (see FIG. 2).

A printer controller (PRTC) 8 is connected to the printer 1500 via a predetermined bi-directional I/F (interface) 21, and executes communication control processing for print data or the like with the printer 1500. The CPU 1 executes developing (rasterizing) processing for an outline font into a display information RAM set on, for example, the RAM 2, thereby enabling WYSIWYG (What You See Is What You Get) to be realized on the display 10. The CPU 1 opens various registered windows and executes various data processes based on commands instructed by a mouse cursor or the like displayed on the screen of the display 10. When a user instructs an apparatus to execute print processing, the user opens a window regarding the print setting and can set a desired printer and set a print processing method for the printer driver including print function selection.

Next, a description will be given of the configuration of the printer 1500. The CPU 12 of the printer 1500 outputs an image signal as output information to a print unit (printer engine) 17 via a print unit I/F 16 which is connected to a system bus 15, based on a control program or the like. A control program is stored in the program ROM in a ROM 13 or is stored in an external memory 14. The font ROM in the ROM 13 stores font data and the like which are used when the output information is generated. When a printer does not have the external memory 14 such as a hard disk or the like, the data ROM in the ROM 13 stores information and the like which are used on the host computer 3000. The CPU 12 performs communication processing with the host computer 3000 via an input unit 18 and notifies the host computer 3000 of the information or the like in the printer 1500. A RAM 19 functions as a main memory, a work area, or the like in the CPU 12. A memory capacity of the RAM 19 can be expanded by an option RAM connected to an expansion port. The RAM 19 is used as an output information developing area, an environment data storing area, an NVRAM (Non Volatile RAM), or the like. An access to the external memory 14 such as a hard disk (HD), an IC card, or the like is controlled by a memory controller (MC) 20. The external memory 14 is connected as an option device and stores font data, an emulation program, form data, and the like. Switches for a user operation, an LED (Light Emitting Diode) display, and the like are arranged on an operation unit 1501. The number of the external memories 14 may be two or more. For example, the external memory 14 may also be constructed in a manner such that, in addition to built-in fonts, a plurality of external memories in which option font cards or a program that can interpret printer control languages of different language systems are stored be connected to the printer 1500. Furthermore, it may be also possible to have an NVRAM and store printer mode setting information from the operation unit 1501.

Figure 2:
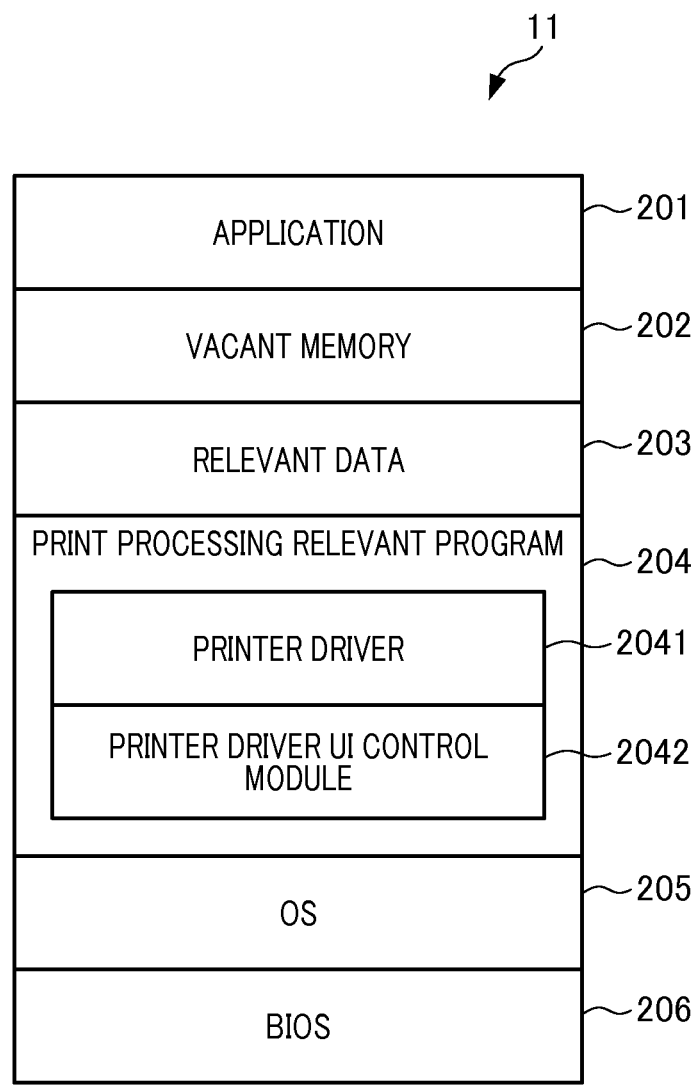
FIG. 2 is a diagram illustrating a configuration of an external memory according to one embodiment of the present invention.

FIG. 2 is a block diagram illustrating a configuration of a program and the like mounted on the external memory 11 of a print processing system according to one embodiment of the present invention. As shown in FIG. 2, the external memory 11 stores an operating system program (hereinafter referred to as "OS") 205, various types of application 201, related data 203, BIOS 206, and a print processing relevant program 204, and includes a free memory 202. An example of the various types of application 201 includes a document processing application program that performs document processing in which graphics, images, characters, tables, and the like coexist. The external memory 11 also stores a user file, an editing file, and the like relating to the various types of application 201. The print processing relevant program 204 is a program for generating print data which is described by using a page description language and is used in common to a plurality of printers of the same series. Also, the print processing relevant program 204 includes a printer control command generation module (hereinafter referred to as "printer driver") 2041 and a printer driver user interface control module (hereinafter referred to as "printer driver UI control module") 2042. Note that the print processing relevant program 204 may also referred to as a "printer driver". The printer driver UI control module 2042 and the application 201 according to the present embodiment, which are stored in the external memory 11, are loaded by the RAM 2 and can be executed by the CPU 1. Also, the CPU 1 executes, for example, developing (rasterizing) processing for an outline font into the RAM 2, thereby enabling WYSIWYG to be realized on the display 10. Furthermore, the CPU 1 opens registered windows and executes various information processes based on commands instructed by using the operation input device 9 on the display 10. The function enables to set a desired printer and settings of print processing for the printer driver 2041 including print mode selection within the print setting screen controlled by the printer driver UI control module 2042.

FIG. 3 is a diagram illustrating an exemplary print setting screen displayed on a display by the printer driver UI control module 2042 according to one embodiment of the present invention. As shown in FIG. 3, in the present embodiment, the print setting screen is constituted by two screens including a print setting screen 310 and a my sheet screen 300. The present invention is not limited to two screens but the items displayed on the my sheet screen 300 may be displayed on each property sheet in the print setting screen 310 or may also be displayed on one sheet in the print setting screen 310. The print setting screen 310 receives output sheet size settings, page aggregation settings, double-sided printing settings, and the like. The my sheet screen 300 is a screen on which a "frequently-used setting" list (hereinafter referred to as "frequently-used setting") 301 and a "setting history" list (hereinafter referred to as "setting history") 303 are displayed. The frequently-used setting (first display unit) 301 is a region on which the names of print setting information are displayed when the names of print setting information constituted by a plurality of parameters such as output sheet size, page aggregation, double-sided printing, and the like which can be set on the print setting screen 310 are set for registration. Although there is a "favorite" function which is defined the same as the frequently-used setting, the "favorite" and "frequently-used" settings are treated as the same functions in the present invention. The setting history (second display unit) 303 is a region on which identification information of setting history data in print setting information obtained when a user provides an instruction for generating print data is displayed. The name of setting history data is generated based on the date and time at which an instruction for generating print data has been received. On the frequently-used setting 301, not only the name of pre-registered print setting information but also the name of print setting information manually registered by a user are displayed. A frequently-used setting registration method is performed as follows. For example, a user firstly sets desired parameters to the items on the print setting screen 310. Next, the pressing of a registration button 302 on the my sheet screen 300 is received. When the pressing of the registration button 302 is received, a name setting screen is displayed and any name is input on the screen so as to complete registration, so that the registered name is added to the frequently-used setting 301.

FIG. 4 is a diagram illustrating exemplary frequently-used settings stored in an information processing apparatus. A plurality of parameters ("page aggregation", "binding direction", and "double-sided printing") is registered to the name of the frequently-used setting 301 such as "2 in 1 (single-sided)", "2 in 1 (double-sided)", or the like. Note that a plurality of parameters is not limited to the settings shown in FIG. 4 but may be any parameter as long as a printer to be used can perform output.

FIG. 5 is a diagram illustrating an example of setting history data stored in an information processing apparatus. The settings shown in FIG. 5 correspond to setting history data indicated on the setting history 303 of the my sheet screen 300 shown in FIG. 3 and the parameters are registered to the name of the setting history 303 based on the set date and time. Note that a plurality of parameters constituting setting history data is not limited to the parameters shown in FIG. 5.

FIG. 6 is a flowchart illustrating processing for setting a name described in the setting history 303 according to one embodiment of the present invention. The steps in the flowchart of the present invention are realized by reading and executing a program relating to the processing in the flowchart from a memory by the CPU 1. When current print setting information is displayed as setting history data, the printer driver UI control module 2042 sets the name of history as follows. A print setting comparison loop starts (S600A). Firstly, the printer driver UI control module 2042 compares current print setting information with print setting information on the frequently-used setting 301 (step S600). The generally used method for comparing print setting information with each other is a method for comparing parameters constituting print setting information one by one. Note that current settings may also be set to print setting information not intended by a user depending on a print environment such as the OS 205 and the application 201 for printout, the printer 1500 for output, and the like. A specific comparison method taking into account these matters will be described below. Next, the printer driver UI control module 2042 determines whether or not the parameters in current print setting information match the parameters in print setting information on a frequently-used setting to be determined (step S601). When all the parameters are matched, the printer driver UI control module 2042 registers the name of the matched frequently-used setting as the name of setting history data (step S602). When at least one of the parameters is not matched with the parameters, the printer driver UI control module 2042 compares print setting information on the next frequently-used setting with current print setting information. The comparison processing is executed for all the print setting information included in the frequently-used setting 301 (step S600B). When current print setting information is not matched with all the print setting information included in the frequently-used setting, the printer driver UI control module 2042 attaches the name based on the date and time to the current print setting and registers the resulting print setting as setting history data (step S603).

As described above, while the frequently-used setting is registered as a preset value in the printer driver 2041 upon installation of the printer driver 2041, a user may also be able to register any print setting. Print setting information to be registered by the user may be the same as or different from preset print setting information. Here, although the name of a preset value is different from the name of a value registered by a user, the content (parameters) of print setting information may be same. When the print setting content is duplicated, the printer driver UI control module 2042 determines that setting history data is matched with two frequently-used settings. In this case, the printer driver UI control module 2042 preferentially registers the name of the frequently-used setting registered by a user in setting history data.

Here, a description will be given of an example of actual processing for changing the name of the setting history 303. The printer driver UI control module 2042 recognizes that an "OK" button 311 or an "apply" button 312 on the print setting screen 310 already being displayed has been pressed down. The printer driver UI control module 2042 displays print setting information constituted by the currently set parameters as setting history data on the setting history 303 at the timing of recognizing the user operation. When print setting information is displayed, current print setting information is compared with print setting information on each frequently-used setting as in step S600. Consequently, when there is a frequently-used setting in which print setting information is the same as current print setting information, the name of the matched frequently-used setting is associated with current print setting information. Here, the association method may be a method for writing on the interior of the print setting to be stored or may also be a method for writing once in the identification name (e.g., file name or registry key) for storing the print setting. When the printer driver UI control module 2042 displays setting history data in current print setting information by updating display on the my sheet screen 300, the printer driver UI control module 2042 displays the name associated with current print setting information as the name of setting history data.

FIG. 7 is a diagram illustrating a list of setting history data updated by the method shown in FIG. 6. As shown in FIG. 7, in one embodiment of the present invention, the name used in the frequently-used setting is registered by setting it to the same print setting information as that included in the frequently-used setting. The name based on the stored date and time is set to print setting information which was not matched with any of the frequently-used settings.

FIG. 8 is a diagram illustrating a screen to be displayed by executing the processing shown in FIG. 6. The printer driver UI control module 2042 reflects the name of the frequently-used setting to the name of setting history data based on information shown in FIG. 7.

As described above, when there is a frequently-used setting of which the content is matched with the current print setting content, current print setting information is stored as setting history data by use of the name of the frequently-used setting by employing the print processing system according to one embodiment of the present invention. Thus, a user can readily recognize the content of image output setting information included in setting history data from the name of the frequently-used setting.

Second Embodiment

Next, a description will be given of a print processing system according to a second embodiment of the present invention. A feature of the print processing system of the present embodiment lies in the fact that the print setting information parameters can be compared even in the case of occurrence of conflict. Note that the same elements as those in the print processing system of the first embodiment are designated by the same reference numerals and explanation thereof will be omitted. In the first embodiment, a description has been given of a method for comparing parameters one by one as a method for comparing current print setting information with print setting information in the frequently-used settings. However, as described above, current print setting information may also be changed to print setting information not intended by a user depending on a print environment such as the OS 205 and the application 201 for printout, the printer 1500 for output, and the like. For example, after installation of the printer driver 2041, the OS 205 rewrites the default value of an "application ICM setting", which is one of the print setting information parameters, in accordance with the printer driver 2041. By the rewriting, the "application ICM setting" in current print setting information becomes different from the print setting information parameters in the frequently-used setting which has already been registered as a preset upon installation of the printer driver 2041. Consequently, in the processing shown in FIG. 6, it is determined that both settings do not match. Thus, in the present embodiment, the "application ICM setting" (e.g., dmICMMethod in DEVMODE structure) is treated as a specific parameter not to be compared. The term "DEVMODE structure" refers to a data structure for storing printer driver setting information for the case of Windows (registered trademark) of Microsoft Corporation. The DEVMODE structure stores various parameters relating to a logical printer, such as a printer usable function, layout setting, finish setting, sheet feed/discharge setting, print quality setting, and the like. Also the DEVMODE structure includes a region called "standard portion" to which the OS 205 and the application 201 are also accessible and a region called "expansion portion" to which only the printer driver 2041 is accessible. Hence, original size (dmPaperSize), print orientation (dmOrientation), and the number of copies (dmCopys), which are highly probable to be restricted by the application 201, are also set to out-of-comparison objects. Also, when a print setting is forcibly changed due to the device configuration of a printer device or due to an external factor such as the OS 205, the application 201, or the like, a parameter prior to change is used as a parameter for comparison. The device configuration indicates the option state added to a device such as an installation state of a sheet feed cassette, an installation state of a sheet discharge cassette, or the like. Also, forcible change in print setting information is referred to as "conflict resolution processing". The conflict resolution processing indicates the fact that other functions become invalidated or set values are forcibly changed to other set values when a certain function is validated (or invalidated) due to the limitation of the capability of a printer device or the device configuration thereof. For example, when "cassette 2" has originally designated in the sheet feeding method but the sheet feeding option has been removed from the printer device, "cassette 2" cannot be selected and thus print setting information is changed to a default value (e.g., "automatic sheet feeding"). In this case, in the present embodiment, a parameter for comparison is not "automatic sheet feeding" which is a changed parameter but "cassette 2" which is a parameter set by a user. When the original size is designated as "postcard" by the application 201 in a state where double-sided printing is set, double-sided printing cannot be made in the setting of "postcard" and thus a parameter is forcibly changed to single-sided printing. By performing the conflict resolution processing, a set value prior to forcible change is separately stored (in the above example, "double-sided printing" is stored because of "double-sided printing→single-sided printing"). Thus, when conflict resolution processing ends, the set value is set back to the original set value. This is because the parameter changed by the conflict resolution processing is a parameter set in contrary to a user's intention.

Next, a description will be given of a method for comparing parameters in print settings according to the present embodiment with reference to the flowchart shown in FIG. 9.

Figure 9:
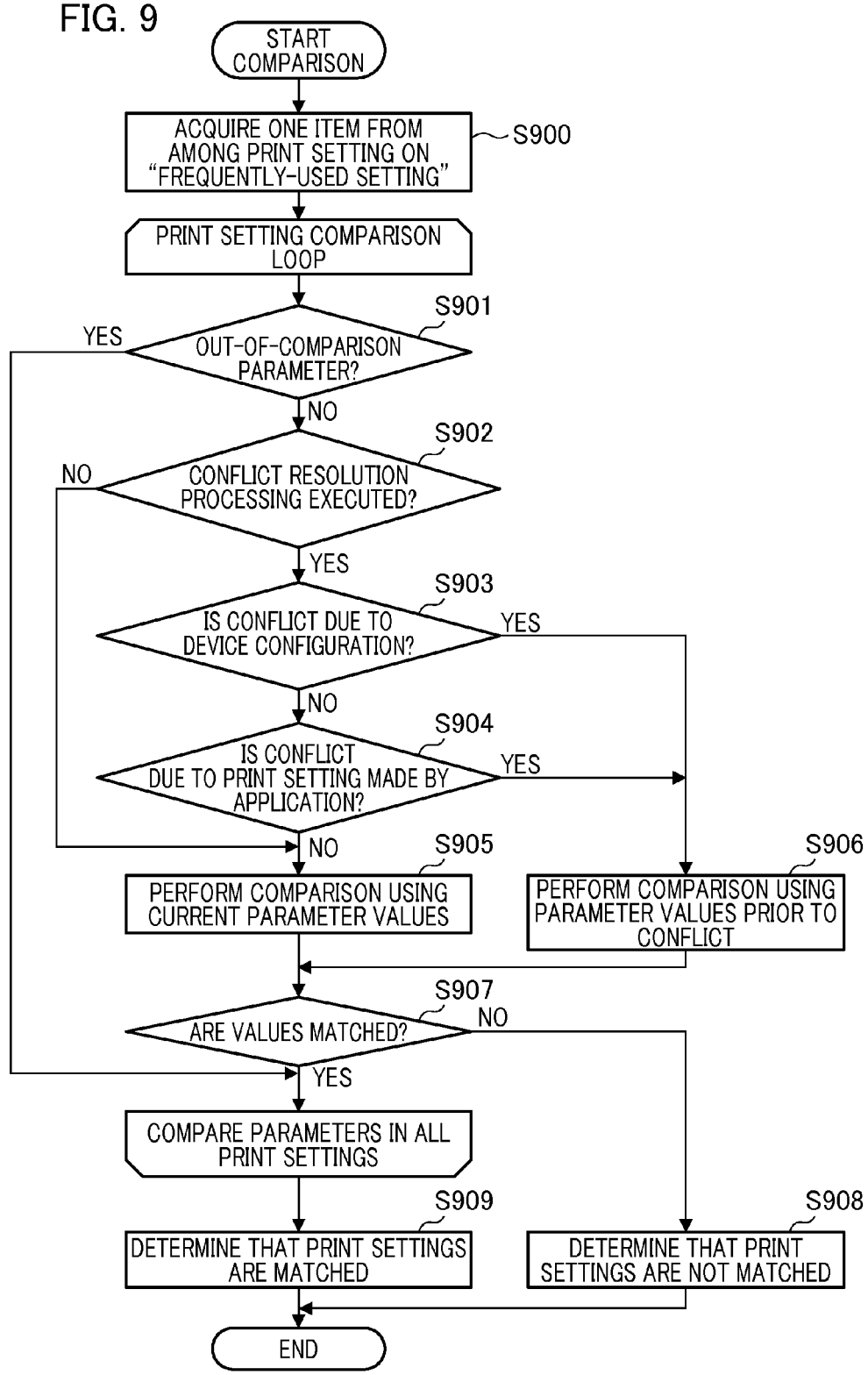
FIG. 9 is a flowchart illustrating comparison processing according to one embodiment of the present invention.

FIG. 9 is a flowchart illustrating the details of processing (step S600) for comparing the current print setting with frequently-used settings according to one embodiment of the present invention. Firstly, the printer driver UI control module 2042 selects and acquires the first frequently-used setting (step S900). A print setting comparison loop starts (S900A). Next, the printer driver UI control module 2042 acquires one of the parameters included in the current print setting. The printer driver UI control module 2042 determines whether or not the acquired parameter is an out-of-comparison parameter (step S901). When the acquired parameter is an out-of-comparison parameter, the next parameter included in the current print setting is used for comparison. When the acquired parameter is a parameter to be compared, the printer driver UI control module 2042 determines the presence or absence of conflict resolution processing (step S902). Here, an example of the specific method for examining the presence or absence of conflict resolution for a parameter to be compared includes a method as follows. Firstly, information representing status such as "available", "notsupport", or the like is included in each parameter. When the parameter is a value other than "available" indicating that the status is valid, the fact indicates that conflict resolution processing has been executed for the parameter. Thus, the printer driver UI control module 2042 determines in step S902 whether or not "available" is described in the parameter. When "available" is not described in the parameter, the process advances to step S903. When no conflict resolution processing is executed, the printer driver UI control module 2042 compares the parameter values in the print setting acquired in step S900 with the parameters in a frequently-used setting to be determined (step S905). When conflict resolution processing has been executed as a result of determining the presence or absence of conflict resolution processing, the printer driver UI control module 2042 determines whether or not the conflict causing factor is due to device configuration (step S903). Here, a method for determining whether or not conflict occurs due to a device factor can be realized by determining whether or not the status of the parameters is "notsupport" indicating that conflict occurs due to a device factor. When conflict occurs due to a device configuration, the printer driver UI control module 2042 executes comparison processing using parameters set prior to execution of conflict resolution processing (step S906). When a conflict causing factor is not a device configuration, the printer driver UI control module 2042 determines whether or not a conflict causing factor is caused by a print setting made by the application 201 (step S904).

Here, the following method can be used as an example of the specific method for determining whether or not conflict occurs due to a print setting made by the application 201. Firstly, the difference between a print setting set by the application 201 and a print setting made after the print setting has been subject to conflict resolution processing is compared. When a parameter which is the difference between print settings has a "notavailable" status indicating the occurrence of conflict due to the influence of other parameters, it can be determined that conflict resolution processing is processing occurred due to the print setting made by the application 201.

When conflict resolution processing occurs due to the print setting made by the application 201, print setting parameters are compared using values prior to occurrence of conflict resolution processing (step S906). When no conflict resolution processing occurs due to the print setting made by the application 201, the printer driver UI control module 2042 executes comparison processing using parameter values upon acquisition of the print setting (step S905). Here, a description will be given of the reason why processing in step S905 is executed if it is determined as NO in step S904. When it is determined as NO in step S904, this indicates the fact that a user has provided an instruction for generating print data after recognition that conflict resolution processing has been executed on the print setting screen 310. Thus, comparison processing is executed by using parameters obtained upon acquisition of the print setting.

When the parameter values match as a result of comparison of the parameters in print settings in step S907, the printer driver UI control module 2042 compares the next parameter included in the acquired print setting. When no parameter value matches in step S907, the printer driver UI control module 2042 determines that the acquired frequently-used setting is not matched with the current print setting (step S908). Then, the next print setting information is acquired in the frequently-used setting 301 so as to perform print setting comparison in the same manner. The aforementioned processing is executed by all the parameters in print setting information (step S900B). When all the parameters in the acquired print setting match each other, the printer driver UI control module 2042 determines that print setting information on the frequently-used setting to be determined is matched with current print setting information (step S909). When the print settings are matched, the printer driver UI control module 2042 registers the name of print setting information on the acquired frequently-used setting to be determined as history data for current print setting information and displays the name.

As described above, the system of the present embodiment determines the presence or absence of conflict resolution processing (conflict determination unit), determines a conflict causing factor (factor determination unit), and changes a parameter value to be compared as a result of determination. With the aid of the configuration, a name which becomes more compatible with a user's intention is reflected to setting history data.

In the present embodiment, a fixed parameter is set as an out-of-comparison object in advance and comparison is performed by using parameter values prior to occurrence of conflict. However, comparison may also be performed by using an external file which is readable by the printer driver UI control module 2042 in order to facilitate parameter management by a user. A user may also display these parameters on a user interface on which the printer driver UI control module 2042 runs. Furthermore, a user may select a parameter to be compared (or a parameter to be set as an out-of-comparison object).

Third Embodiment

Next, a description will be given of a print processing system according to a third embodiment of the present invention. A feature of the print processing system of the present embodiment lies in the fact that, when a frequently-used print setting is edited, the content of setting history data is updated as required. Note that the same elements as those in the print processing system of the first embodiment are designated by the same reference numerals and explanation thereof will be omitted. Firstly, when the print system in the above embodiment is used, the name of the frequently-used setting prior to change or deletion may be slightly different from the registered name of setting history data by changing the name of the frequently-used setting or deleting the frequently-used setting itself. In order to prevent a shift in name, the print system of the present embodiment updates setting history data when the frequently-used setting is edited or deleted. More specifically, when the content of print setting information on the frequently-used setting is edited, the printer driver UI control module 2042 examines setting history data with the same name as that of the edited frequently-used setting from the setting history 303. When there is setting history data with the same name as that of the edited frequently-used setting, content (parameter) comparison is performed again. When there is a difference in content between setting history data and the edited frequently-used setting, the printer driver UI control module 2042 changes the name of setting history data to the name based on date and time. When the name of the frequently-used setting is edited, the printer driver UI control module 2042 specifies setting history data with the same name as that prior to editing of the frequently-used setting of which the name has been edited from the setting history 303. Then, content (parameter) comparison is performed again between the specified setting history data and the frequently-used print setting of which the name has been edited. Consequently, when the content of the print setting is identical, the printer driver UI control module 2042 changes the name of setting history data to the name of the frequently-used print setting of which the name has been edited. When the frequently-used setting is deleted, the printer driver UI control module 2042 examines setting history data with the same name as that of the frequently-used setting deleted from the setting history 303. When the name of setting history data is the same name as that of the frequently-used setting deleted from the setting history 303, the printer driver UI control module 2042 changes the name of setting history data to a name based on the date and time at which setting history data has been set.

As described above, when the print system of the present embodiment is used, the name of the setting history 303 is always synchronized with the name of the item on the frequently-used setting 301, so that correct information can always be displayed to a user.

Fourth Embodiment

Figure 10:
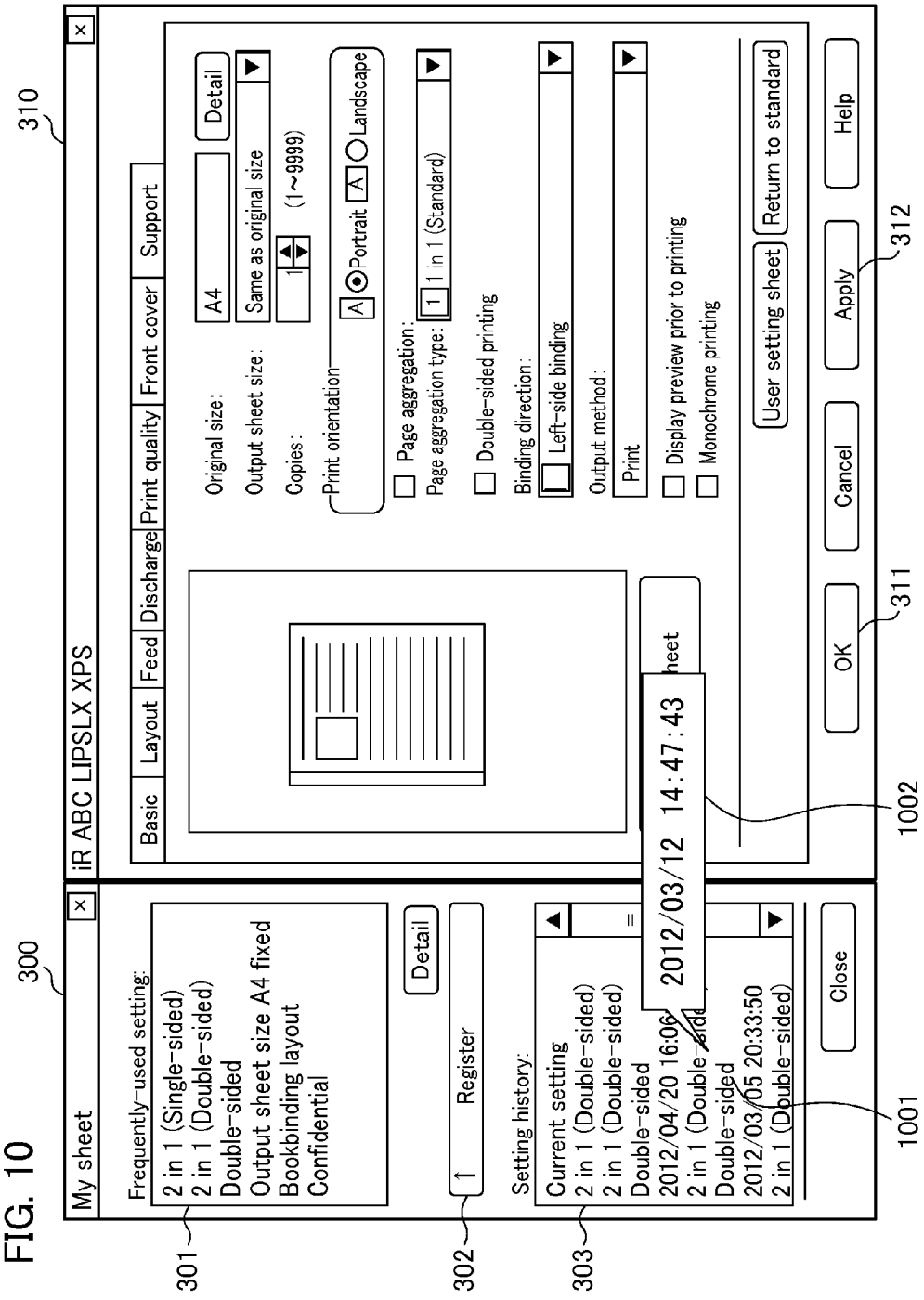
FIG. 10 is a diagram illustrating an exemplary my sheet screen according to one embodiment of the present invention.

Next, a description will be given of a print processing system according to a fourth embodiment of the present invention. A feature of the print processing system of the present embodiment lies in the fact that set date and time information is further displayed on setting history data for which the name has been changed. Note that the same elements as those in the print processing system of the first embodiment are designated by the same reference numerals and explanation thereof will be omitted. Firstly, in the above embodiment, a user can readily manage print settings by changing the name of setting history data on the setting history 303 to the name of the frequently-used setting. However, since the name of setting history data is changed from the name based on the set date and time to any name, the date and time at which the print setting has been made is undesirably deleted from the name. Thus, as shown in FIG. 10, when a user hovers a mouse cursor 1001 over setting history data for which the name has been changed to the name of the frequently-used setting from among the setting history 303, the date and time at which the print setting for the setting history data has been made is displayed on a tool tip 1002. With the aid of the configuration, a user can know the content of the print setting and the set date and time on only the my sheet screen 300.

As described above, when print setting information about setting history data on the setting history 303 and print setting information for the frequently-used setting are identical, the name of the setting history data is changed to the name of the frequently-used setting having the same print setting information. Furthermore, the set date and time can be displayed. With the aid of the configuration, a user can readily manage the frequently-used setting. Consequently, the print setting used by a user can be readily identified, resulting in an improvement in print setting efficiency.

While, in the present embodiment, a description has been given of a print processing system in which the parameters constituting print setting information on the setting history 303 and the frequently-used setting 301 are compared with each other and the identical name is registered when the settings are identical, the present invention is not limited thereto. For example, when it is determined that the settings are identical as a result of print setting comparison, the name to be used as a print job may also be employed on the setting history 303. Also, as a first display unit to be compared, a list on which the names of print setting information are displayed, such as a list of print job names, a list of document names, or the like, may be used.

While, in the present invention, a description has been give of a case where print data is generated by using a printer driver, a PDF writer may also perform processing in the same manner as that employed in the present invention when document data in PDF format is generated from application data using the PDF writer. At this time, since document data itself is not printed, set information is PDF setting information. Note that print setting information and PDF setting information are collectively referred to as "image output setting information". Furthermore, print data and document data generated by a PDF writer are collectively referred to as "output data".

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-186465 filed on Aug. 27, 2012 which is hereby incorporated by reference herein in its entirety.

What is claimed is:

1. An information processing apparatus comprising:
a processor and a memory communicably coupled to function as:
a registration unit configured to register print setting information and a name of the print setting information;
a first display unit configured to display the name of the print setting information registered by the registration unit; and
a second display unit configured to display a history data of print instruction when a generation of print data based on the print setting information set via a setting screen is instructed,
wherein the second display unit displays the history data relating to a plurality of the print instructions, and
wherein, among the history data relating to the plurality of the print instructions, the second display unit displays the history data using the name of the print setting information registered by the registration unit when the print setting information set for the print data is the same as the print setting information registered by the registration unit, and displays the history data without using the name of the print setting information registered by the registration unit so as to identifiably display the history data for which the print setting information set for the print data is the same as the print setting information registered by the registration unit from the history data for which the print setting information set for the print data is different from the print setting information registered by the registration unit when the print setting information set for the print data is different from the print setting information registered by the registration unit.

2. The information processing apparatus according to claim 1, wherein, when the print setting information corresponding to the displayed name is compared with the print setting information for the print data, specific parameters are selected and compared.

3. The information processing apparatus according to claim 1, further comprising:
a conflict determination unit configured to determine the presence or absence of a conflict resolution processing included in the print setting information for the print data; and
a factor determination unit configured to determine a conflict causing factor,
wherein, when the factor determination unit determines that the conflict causing factor is due to a device configuration, the print setting information prior to execution of the conflict resolution processing is compared with the print setting information of the name displayed on the first display unit.

4. The information processing apparatus according to claim 2, further comprising:
a conflict determination unit configured to determine the presence or absence of a conflict resolution processing included in the print setting information for the print data; and
a factor determination unit configured to determine a conflict causing factor,
wherein, when the factor determination unit determines that the conflict causing factor is due to a device configuration, the print setting information prior to execution of the conflict resolution processing is compared with the print setting information of the name displayed on the first display unit.

5. The information processing apparatus according to claim 1, further comprising:
   a conflict determination unit configured to determine the presence or absence of a conflict resolution processing included in the print setting information for the print data; and
   a factor determination unit configured to determine a conflict causing factor,
   wherein, when the factor determination unit determines that the conflict causing factor is due to an application, the print setting information prior to execution of the conflict resolution processing is compared with the print setting information of the name displayed on the first display unit.

6. The information processing apparatus according to claim 1, wherein, when the registered print setting information is changed, the changed print setting information is again compared with the print setting information for the print data.

7. The information processing apparatus according to claim 1, wherein the second display unit displays the history data of the print instruction using date and time information when the print setting information set for the print data is not the same as the print setting information registered by the registration unit.

8. The information processing apparatus according to claim 7, wherein the second display unit displays the history data of the print instruction using the name of the print setting information registered by the registration unit without using the date and time information when the print setting information set for the print data is the same as the print setting information registered by the registration unit, and further displays date and time information when the name of the print setting information is specified.

9. The information processing apparatus according to claim 1, wherein the second display unit displays the history data of the print instruction using the name of the print setting information without using time information at which the generation of the print data is instructed when the print setting information set for the print data is the same as the print setting information registered by the registration unit.

10. The information processing apparatus according to claim 1, wherein the second display unit displays the history data of the print instruction using time information at which the generation of the print data is instructed without using the name of the print setting information when the print setting information set for the print output data is different from the print setting information registered by the registration unit.

11. A method for controlling an information processing apparatus having a processor and a memory communicably coupled together, the method comprising:
    the processor and memory executing the steps of:
    a registration step of registering print setting information and a name of the print setting information;
    a first display step of displaying the name of the print setting information registered in the registration step; and
    a second display step of displaying a history data of print instruction when a generation of print data based on the print setting information set via a setting screen is instructed,
    wherein the second display step displays the history data relating to a plurality of the print instructions, and
    wherein, among the history data relating to the plurality of the print instructions, the second display step displays the history data using the name of the print setting information registered in the registration step when the print setting information set for the print data is the same as the print setting information in the registration step, and displays the history data without using the name of the print setting information registered by the registration unit so as to identifiably display the history data for which the print setting information set for the print data is the same as the print setting information registered by the registration step from the history data for which the print setting information set for the print data is different from the print setting information registered by the registration step when the print setting information set for the print data is different from the print setting information registered by the registration step.

12. The control method according to claim 11, wherein, when the print setting information corresponding to the displayed name is compared with the print setting information for the print data, specific parameters are selected and compared.

13. The control method according to claim 12, further comprising:
    determining the presence or absence of a conflict resolution processing included in the print setting information for the print data; and
    determining a conflict causing factor,
    wherein, when the conflict causing factor is due to a device configuration, the print setting information prior to execution of the conflict resolution processing is compared with the print setting information of the name displayed.

14. The control method according to claim 11, further comprising:
    determining the presence or absence of a conflict resolution processing included in the print setting information for the print data; and
    determining a conflict causing factor,
    wherein, when the conflict causing factor is due to a device configuration, the print setting information prior to execution of the conflict resolution processing is compared with the print setting information of the name displayed.

15. The control method according to claim 11, further comprising:
    determining the presence or absence of a conflict resolution processing included in the print setting information for the print data; and
    determining a conflict causing factor,
    wherein, when the conflict causing factor is due to an application, the print setting information prior to execution of the conflict resolution processing is compared with the print setting information of the name displayed.

16. The control method according to claim 11, wherein, when the registered print setting information is changed, the changed print setting information is again compared with the print setting information for the print data.

17. A non-transitory storage medium storing a readable program for causing a computer to execute a method for controlling an information processing apparatus, the program comprising code to execute:
    a registration step of registering print setting information and a name of the print setting information;

a first display step of displaying the name of the print setting information registered in the registration step; and a second display step of displaying a history data of print instruction when a generation of print data based on the print setting information set via a setting screen is instructed, wherein the second display step displays the history data relating to a plurality of the print instructions, and wherein, among the history data relating to the plurality of the print instructions, the second display step displays the history data using the name of the print setting information registered in the registration step when the print setting information set for the print data is the same as the print setting information in the registration step, and displays the history data without using the name of the print setting information registered by the registration step so as to identifiably display the history data for which the print setting information set for the print data is the same as the print setting information registered by the registration step from the history data for which the print setting information set for the print data is different from the print setting information registered by the registration step when the print setting information set for the print data is different from the print setting information registered by the registration step.

18. The non-transitory storage medium according to claim 17, wherein, when the print setting information corresponding to the displayed name is compared with the print setting information for the print data, specific parameters are selected and compared.

19. The non-transitory storage medium according to claim 18 further comprising code to execute:

determining the presence or absence of a conflict resolution processing included in the print setting information for the print data; and determining a conflict causing factor, wherein, when the conflict causing factor is due to a device configuration, the print setting information prior to execution of the conflict resolution processing is compared with the print setting information of the name displayed.

20. The non-transitory storage medium according to claim 17 further comprising code to execute:

determining the presence or absence of a conflict resolution processing included in the print setting information for the print data; and determining a conflict causing factor, wherein, when the conflict causing factor is due to a device configuration, the print setting information prior to execution of the conflict resolution processing is compared with the print setting information of the name displayed.

21. The non-transitory storage medium according to claim 17 further comprising code to execute:

determining the presence or absence of a conflict resolution processing included in the print setting information for the print data; and determining a conflict causing factor, wherein, when the conflict causing factor is due to an application, the print setting information prior to execution of the conflict resolution processing is compared with the print setting information of the name displayed.

22. The non-transitory storage medium according to claim 17, wherein, when the registered print setting information is changed, the changed print setting information is again compared with the print setting information for the print data.

* * * * *